March 30, 1965 R. J. WORBOIS ET AL 3,175,389
BRAKE PIPE INTEGRITY SIGNALLING APPARATUS
Filed Nov. 6, 1962
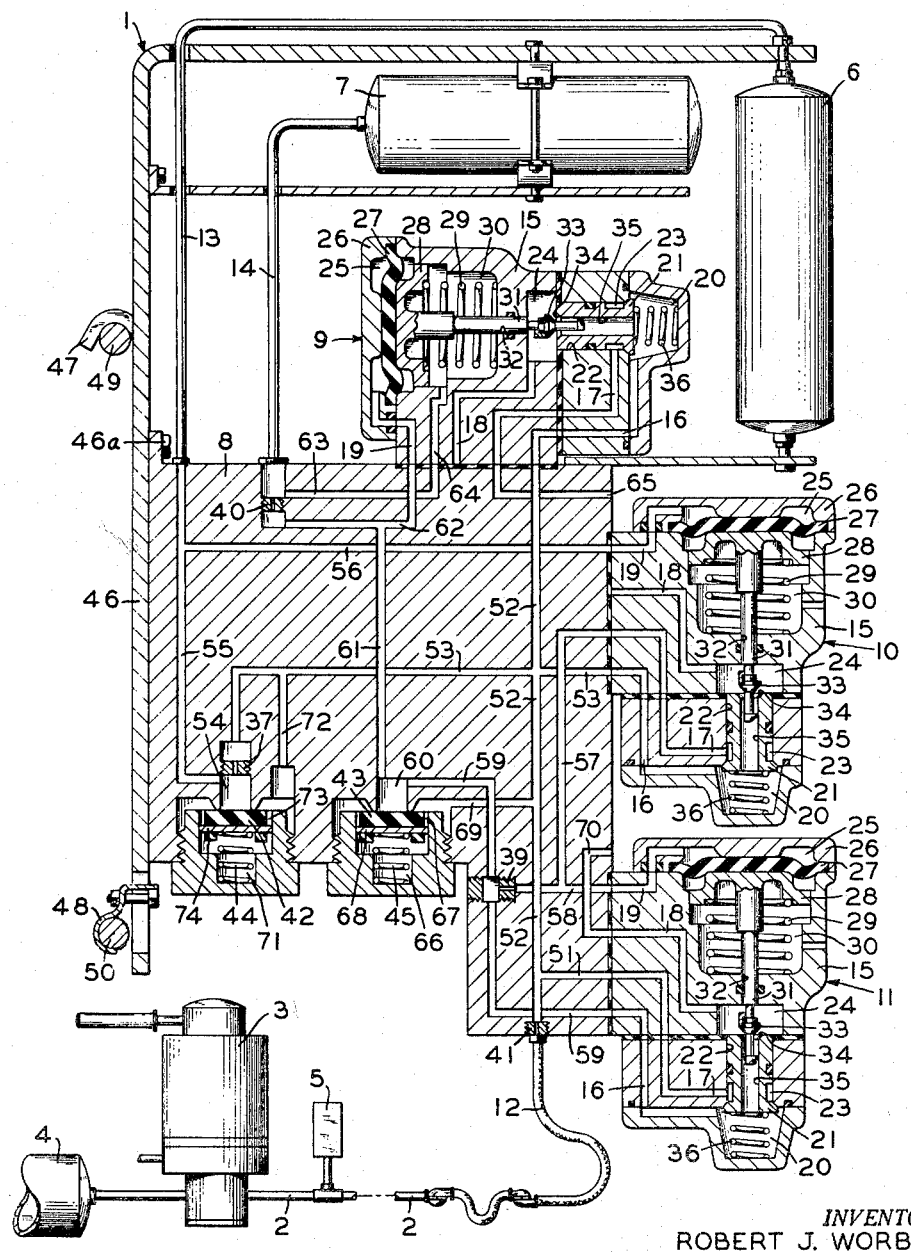
INVENTORS
ROBERT J. WORBOIS
WILLIAM B. JEFFREY
BY
ATTORNEY

3,175,389
BRAKE PIPE INTEGRITY SIGNALLING APPARATUS
Robert J. Worbois and William B. Jeffrey, Irwin, Pa., assignors to Westinghouse Air Brake Company, Wilmerding, Pa., a corporation of Pennsylvania
Filed Nov. 6, 1962, Ser. No. 235,624
11 Claims. (Cl. 73—39)

This invention relates to a train pipe integrity indicating transmitter and more particularly to a transmitting device for indicating the integrity of the brake pipe on a train of standard freight cars utilizing unattended automatic brake control equipment.

A completely automated freight train has been recently developed utilizing standard freight cars. The propulsion and braking operations of this train are designed to be controlled by automatic equipment without the necessity of any train crew. The automatic braking operations are effected through the use of a single brake pipe extending throughout the length of the train. The brake equipment on the locomotive can be selectively controlled manually or completely automatically by wayside apparatus. The automatic brake equipment is designed such that when changing control from manual to automatic it is necessary to make an emergency brake application. Upon release after the aforesaid emergency brake application, and before leaving the train unattended, it is desirable to check the integrity of the brake pipe throughout the entire length of the train to insure that brake pipe communication is continuous with no angle cocks inadvertently closed.

According to the present invention, there is provided a portable brake pipe integrity indication transmitter means for connection to the brake pipe on a train equipped with automatic propulsion and braking controls, said transmitter means being located at the last car and operative only responsively to fluid pressure variations in the brake pipe to automatically effect indication on the locomotive via the brake pipe that the brake pipe is being charged and also that the brake pipe on the last car has been fully charged, thereby determining the integrity of the brake pipe connections throughout the train.

In the accompanying drawing, FIG. 1 is a sectional view of the integrity indicating transmitting apparatus shown diagrammatically as connected to certain elements of standard train braking controls.

Description

Referring to the drawing, there is shown a portable transmitting device 1 adapted to be removably mounted on the last car of a train, said device being connected to a brake pipe 2 extending throughout the train to controls on the locomotive, of which only basic elements are shown and described herein including a brake valve 3, a main reservoir 4 and a flowmeter device 5. The transmitting device 1 also includes two attached reservoirs 6 and 7 secured in a manner hereinafter described.

The transmitting device 1 comprises a body portion 8 and three similar relay valves 9, 10 and 11 suitably attached thereto (by means not shown). The relay valves (described hereinafter) are of the type similar to the standard Westinghouse Air Brake Company H–5 Relayair Valve now in common usage on trains. A flexible pipe 12 connects the body portion 8 of the transmitting device to the brake pipe 2, and pipes 13 and 14 connect the body portion 8 to the reservoirs 6 and 7, respectively.

Each of the relay valves 9, 10 and 11 are constructed essentially the same, therefore, only a single description is necessary herein. Each of the relay valves 9, 10 and 11 comprises a valve body 15 with four passages 16, 17, 18 and 19 therein leading respectively to a chamber 20 formed by the body and a spool valve 21 slidable within a bore 22, a supply groove 23 in the spool valve 21, a delivery chamber 24 formed by the body 15 and the spool valve 21, and a control chamber 25 formed by a body cap 26 and a diaphragm 27. Connected by means (not shown) to the diaphragm 27 is a piston 28 biased towards the body cap 26 by a spring 29 within a spring chamber 30 formed by the body 15 and the diaphragm 27. The spring chambers 30 of relay valves 10 and 11 are vented to atmosphere while the spring chamber 30 of relay valve 9 is connected to a passage described hereinafter. The spring 29 of each relay valve is selected with different biasing pressures as described, as explained hereinafter. The piston 28 has a piston stem 31 extending away from the diaphragm concentrically through the spring 29 and a bore 32 in the valve body 15 to the delivery chamber 24 where it is suitably attached to a valve 33 which is adapted to seat on a valve seat 34 formed on the spool valve 21 around the circumference of a bore 35 extending axially through the spool valve 21 from the delivery chamber 24 to the spring chamber 20. A spring 36 in the chamber 20 between the body 15 and the spool valve 21 biases said spool valve towards the delivery chamber 24 to a seated position as shown.

Located in various passages hereinafter described are a plurality of chokes 37, 39, 40 and 41, and check valves 42 and 43 with their respectively associated springs 44 and 45 described hereinafter.

The entire portable transmitting device 1 including the valve body with its attached relay valves 9, 10 and 11 and reservoirs 6 and 7 is attached to a hanger bracket 46 by a plurality of bolts shown herein as single bolt 46a, with two hook pieces 47 and 48 bolted on said bracket to hang securely over the back ladder on the rear car of the train, said ladder being represented herein by the ladder rungs 49 and 50.

Operation

In operation, when a freight train equipped with automatic braking apparatus is shifted from manual operation to automatic operation, it is necessary to bring the train to a standstill and then effect an emergency brake application manually by use of the brake valve 3 before the automatic equipment can be conditioned for automatic operation. After such an emergency application, the brake pipe must be charged throughout the train. During charging of the brake pipe 2, fluid under pressure flows from the main reservoir 4 via the brake valve 3 and flowmeter 5 and thence via the brake pipe 2 to the transmitting device 1 by way of flexible pipe 12. The flowmeter 5 will indicate (by means not shown) the rate of flow of fluid under pressure to the brake pipe, said rate being initially high and becoming lesser in degree as the brake pipe approaches a state of being fully charged.

Fluid under pressure from the flexible pipe 12 flows through the transmitting device 1 by way of choke 41, passage 52, passage 53, through choke 37 to a chamber 54 and thus to passage 55 and pipe 13 to the reservoir 6, to charge the reservoir 6 at a rate determined by the size of the orifice in choke 37 and during a time interval the length of which is also determined by the capacity of the reservoir 6. The choke 37 serves cooperatively with choke 41 during charging of the brake pipe to slow down the charging time of reservoir 6 such that the reservoir 6 is not fully charged to 60 p.s.i. until a predetermined time after the brake pipe has been approximately fully charged to the full 60 p.s.i. thereby preventing any undesired operation of the transmitting device before the brake pipe is approximately fully charged. When the brake pipe is charged to 60 p.s.i., the flowmeter on the head end of the train will indicate a low rate of flow. Choke 37 also is utilized to prevent any surge of fluid pressure in the brake pipe from effecting premature operation of the transmitting device. During initial charging, the fluid under pressure from the brake pipe also flows to relay valve 9 by way of passage 52 to the chamber 20 thereof, and thence through the bore 35 of relay valve 9 to a delivery chamber 24 thereof and passage 18 which is blanked off.

Brake pipe fluid under pressure also flows to relay valve 10 by way of passage 52, passage 53 and passage 16 of relay valve 10 to the chamber 20 thereof and thence through the bore 35 in the spool valve 21 of said relay valve to a delivery chamber 24 and blanked-off passage 18. Brake pipe fluid under pressure also flows to relay valve 11 by way of passage 52, passage 51, passage 17 of relay valve 11 and supply groove 23 in the spool valve 21 of relay valve 11 which is blanked off as shown.

During the initial charging of the apparatus, the chokes 41 and 37 have delayed the charging of the reservoir 6 to allow for sufficient time for full charging of the brake pipe and associated control equipment throughout the train. While the reservoir 6 is being charged during the predetermined time to accomplish full charge of the brake pipe, a branch passage 56 leading off passage 55 supplies fluid under pressure to the control chamber 25 of the relay valve 10 by way of passage 19 in said relay valve. With fluid under pressure at 60 p.s.i. established in the control chamber 25 of the relay valve 10, the diaphragm 27 and associated piston 28 will move downward to an operating position against the biasing forces of the spring 29 (having a biasing force of approximately 60 p.s.i.) such that the valve 33 of said relay valve 10 seats on the valve seat 34 on the spool valve 21 sealing off communication through the bore 35 and moves the spool valve 21 downward against the spring 36 thereby establishing communication between the passages 16 and 17 of said relay valve 10 by way of the supply groove 23 in the spool valve 21 thereof. With this described communication established, fluid under pressure from the brake pipe flows by way of passage 17 of relay valve 10 to passage 57 and from thence to a plurality of locations described as follows:

(a) To passage 58 and passage 19 of the relay valve 11 leading to the control chamber 25 of said relay valve to cause the diaphragm 27 and piston 28 of said relay valve to move downward to an operating position in which the valve 33 is seated on the valve seat 34 and the spool valve 21 is moved downward to an operating position in which passages 16 and 17 of said relay valve 11 are in communication with each other by way of the groove 23 in the spool valve 21;

(b) Passage 58 through a limiting choke 39 to a passage 59, a chamber 60, passage 61, and passage 62 where said fluid under pressure which is limited due to choke 39 is led by way of a choke 40 and pipe 14 to a reservoir 7 and also to passage 19 of the relay valve 9 and then to the chamber 25 of said relay valve. A branch passage 63 leads from a chamber between the charging time delaying choke 40 and pipe 14 to a special passage 64 peculiar only to the relay valve 9 and thence to chamber 30 of said relay valve for time delayed pressure equalization reasons explained hereinafter. The passage 59 leading from the limiting choke 39, in addition to leading to the chamber 60, also leads to the passage 16 of the relay valve 11 which opens to the chamber 20 of said relay valve for reasons explained hereinafter. In that the chamber 20 of relay valve 11 is initially connected to atmosphere through the bore 35 in the spool valve 21, the choke 39 is utilized not only to restrict the flow of fluid under pressure to the relay valve 9 but to slow down flow of fluid under pressure to vented chamber 20 of relay valve 11 until the relay valve 11 is moved to its operating position (as aforedescribed) in which the bore 35 is closed by valve 33. When the fluid under brake pipe pressure supplied to the chamber 25 of the relay valve 11 attains a predetermined pressure, of say approximately 10 p.s.i., the diaphragm 27 and piston 28 thereof will be moved downward to an operating position as previously mentioned to seat the valve 33 on the valve seat 34 and move the spool valve 21 downward against the biasing forces of spring 36 such that the passages 16 and 17 of said relay valve 11 are in communication with each other via the groove 23. With this just-established communication between passages 16 and 17, brake pipe pressure from flexible pipe 12, choke 41, passage 52, and passage 51 can be fed rapidly and directly via passage 17 and groove 23 of the spool valve 21 of said relay valve 11 to the passage 16 thereof and thence to passage 59, bypassing the choke 39 and opening directly to the chamber 60, passage 61, and passage 62 leading to both the reservoir 7 by way of pipe 14, and passage 19 of the relay valve 9 to the control chamber 25 thereof. Simultaneously with the delivery of fluid under pressure to the control chamber 25 of relay valve 9, fluid under pressure is also supplied by way of passage 62 and charging time delaying choke 40 and passage 63 to the spring chamber 30 on the underside of the piston 28 and diaphragm 27 of relay valve 9 at a slow rate due to the effect of choke 40. Because of the spring chamber 30 being at this time charged with very little fluid under pressure and charging slower than chamber 25 which is rapidly charged to 60 p.s.i. on the opposite side of diaphragm 27, the diaphragm 27 and piston 28 of said relay valve 9 are moved to a venting position by the fluid pressure in chamber 25 against the biasing forces of the spring 29 to seat the valve 33 thereof on the valve seat 34 and move the spool valve 21 against the biasing forces of the spring 36 such that communication is established between pipes 16 and 17 of said relay valve 9 by way of the groove 23 in the spool valve 21 thereof. It should be noted herein that only the sudden surge of fluid under 60 p.s.i. to chamber 25 of relay valve 9 is sufficient to move the piston 28 thereof to a venting position. In that the passage 16 of said relay valve 9 is connected directly to the brake pipe by way of passage 52, choke 41 and flexible pipe 12, and passage 17 of said relay valve is connected to atmosphere by way of a passage 65, a blow-down of brake pipe will be effected at said relay valve 9 at a rate determined by the size of choke 41 to be similar to a service rate reduction of brake pipe pressure. This reduction of fluid pressure is readily detected by the flowmeter which will indicate a sudden increase in rate of flow of charging fluid under pressure on the locomotive of said train, and in that such reduction is only effected when the brake pipe is intact and charged, the indication at the flowmeter signifies the integrity condition of said brake pipe. The reduction of brake pipe pressure caused by the transmitter device is detected and indicated by the flowmeter due to the sudden increase in rate of flow of charging fluid under pressure therethrough. Upon receipt of this indication at the flowmeter, brake controls on the locomotive are operated manually or by automatic means (not part of this invention) to stop the charging of the brake pipe, release any service brake application effected by the aforesaid brake pipe reduction, and perform other operations, an understanding of which is not necesary for an understanding of the present invention.

After a predetermined time interval determined by the flow capacity of choke 40 and the volume of reservoir 7, the fluid under pressure supplied to reservoir 7 via the choke 40 and simultaneously passages 63 and 64 of relay valve 9 to the chamber 30 builds up in spring chamber 30 sufficiently to cooperate with the forces of spring 39 to equal the pressure in the control chamber 25 of the relay valve 9. With this pressure equalization, the piston 28 and diaphragm 27 return to their normal position, as shown, to permit the spring 36 to return the spool valve 21 to its normal position, as shown, thereby cutting off the blow-down of brake pipe at passage 17 of said relay valve 9 and thus limit the duration of the service rate reduction to a reduction predetermined as sufficient only to cause the charging rate of fluid under pressure to the brake pipe at the locomotive to increase an amount which can be detected and indicated by the flowmeter 5.

Once this pressure equalization on the piston 28 of relay 9 has occurred, the relay valve 9 cannot be effective to cause the just-described service rate blow-down of the brake pipe again, until the reservoir 7 has been completely vented, as after an emergency brake application. This feature is brought about by the fact that during any venting of both the chambers 25 and 30, the chamber 30 is vented at a slower rate due to choke 40, therefore, the piston 28 cannot be moved to its aforedescribed venting position and any subsequent charging of fluid under pressure to the chambers 25 and 30 (as during normal brake pipe charging) will not produce sufficient differential of fluid pressures on the opposite sides of piston 28. The differential of pressures acting on piston 28 must be of the nature of a sudden surge of approximately 60 p.s.i. in chamber 25 with very little pressure in chamber 30 as is accomplished by the initial operation of relay valve 11. It can thus be seen that the venting of brake pipe by the transmitting device is effected once only in the described integrity test. Thus, it will be understood that any subsequent service application initiated from the head of the train by operation of the brake valve 3 will not cause operation of the transmitter device 1.

Any reduction of the brake pipe pressure below 60 p.s.i. will cause the piston 28 and diaphragm 27 of the relay valve 10 to be returned by spring 29 to its normal position as shown. With the piston of the relay valve 10 returned in its normal position, the passage from the brake pipe by way of choke 41, passage 52, passage 53 and passage 16 of the relay valve 10 is cut off at the spool valve groove 23 thereby cutting off supply of brake pipe pressure by way of the communication including passage 17 of said relay valve to the passage 57 and thence to relay valve 11. However, brake pipe pressure is still supplied to the relay valves 11 and 9 by a so-called self-holding pressure means on relay valve 11 by way of passage 52, passage 51, passage 17 of said relay valve, the groove 23 of the spool valve 21, passage 16 thereof, passage 59, choke 39, passage 58 and passage 19 of said relay valve 11 to the control chamber 25. Simultaneously, brake pipe pressure is supplied to the control chamber 25 of the relay valve 9 by way of passage 59, chamber 60, passage 61 and passage 62 leading to said control chamber 25 and also to the reservoir 7 which, in turn, is connected to the spring chamber 30 of relay valve 9 as hereinbefore described. It can thus be seen that lowering of the brake pipe pressure below 60 p.s.i. has no effect on the operation of the relay valves 9 and 11 once pressure has been established above 10 p.s.i. in the control chamber 25 of the relay valve 11. The relay valves 9 and 11 will not be affected by brake pipe reduction until the brake pipe pressure is reduced below 10 p.s.i. at which time the piston and diaphragm of relay valve 11 is returned to its normal position as shown.

During a brake pipe reduction below 10 p.s.i., before the relay valve 11 is returned to its normal position shown (as just described) the fluid under pressure in the reservoir 7 and connected chambers 25 and 30 of relay valve 9 are bleeding down by way of passages 61, chamber 60, passage 59, passage 16 of relay valve 11, groove 23 of spool valve 21 of said relay valve, passage 17 thereof, passage 51, passage 52, choke 41, and flexible pipe 12 to the venting brake pipe. At the time the brake pipe reduces to approximately 10 p.s.i., the spool valve 21 of relay valve 11 moves to a closed position to interrupt the just-described venting communication at groove 23 thereof and stop bleed-down of the reservoir 7 by this communication, but continued venting of the brake pipe slightly below 10 p.s.i. will vent a chamber 66 below the check valve 43 by way of passage 67, past guides 68, passage 69, passage 52, choke 41 and flexible pipe 12 to the venting brake pipe, thereby causing the trapped fluid pressure above the check valve 43 to open the check valve 43 against the pressure of spring 45 and continue venting of the reservoir 7 by way of the venting communication just described for chamber 66. When the pressure in the chamber 25 of relay valve 11 vents to approximately 9 p.s.i., the relay valve 11 will have been returned completely to its normal position (as shown) in which the valve 33 thereof is unseated to permit venting of the reservoir 7 directly to atmosphere by way of passage 61, passage 59, passage 16 of relay valve 11, chamber 20, bore 35, delivery chamber 24 to passage 18 of said relay valve 11, and thence to atmosphere by way of passage 70, to thereby completely vent the reservoir 7 and all connected passages and chambers as is necessary before the relay valve 9 can be rendered operable to effect the brake pipe blow-down hereinbefore described.

During normal service rate venting of brake pipe, the reservoir 6 is vented at a normal rate by way of pipe 13, passage 55, choke 37, passage 53, passage 52, choke 41, and pipe 12 to the venting brake pipe. During emergency rate venting of the brake pipe, the fluid pressure in the rapidly venting passage 53 (connected to brake pipe) will effect a rapid venting of a chamber 71 below the check valve 42 by way of passage 72 and passage 73 past guides 74. With the venting of chamber 71, the fluid pressure above said check valve biases the check valve against the spring 44 in a manner to open the check valve and establish an additional venting communication for reservoir 6 past the check valve 42 at a rate predetermined by the size of choke 41 so as to not interfere with the braking operation, but at the same time effect a more rapid venting of said reservoir 6 than through the normal communication including choke 37 as before described.

After complete venting of the apparatus as just described, the apparatus may again be recharged as described under initial charging.

Having now described the invention, what we claim as new and desire to secure by Letters Patent is:

1. A fluid pressure brake system for railway trains of the type having a brake pipe normally charged with fluid at a certain pressure, a predetermined amount of reduction from which initiates a service brake application, characterized by:
   (a) valve means connected to the brake pipe at the rear end of the train and responsive to an increase in pressure in the brake pipe at the rear end of the train, above a certain pressure, due to charging of the brake pipe from the head end of the train, to effect a venting of fluid from the brake pipe at a sufficient rate and in a sufficient amount to cause a service brake application, and
   (b) means at the head end of the train responsive to charging flow of fluid into the brake pipe at the head end of the train due to flow through the brake pipe towards said valve means occasioned by said venting for indicating the venting operation by said valve means.

2. In combination:
   (a) a brake pipe for a train of cars normally charged to a certain pressure, reduction from which is effective to initiate a brake application,
   (b) valve means connected to the brake pipe adjacent the rear of the train responsive to an increase of fluid pressure in the brake pipe by charging flow from the head end of the train above a certain pressure to effect venting of said brake pipe at the rear end of the train at a predetermined rate, and
   (c) rate of flow measuring means connected to the brake pipe adjacent to the head end of the train responsive to charging flow of fluid under pressure into the brake pipe resulting from the operation of said valve means and effective to indicate the venting of said brake pipe at said predetermined rate of operation of said valve means.

3. For use in a fluid pressure brake system having a brake pipe extending from one end of a train of cars to the other end, means at the said one end of the train for at one time charging said brake pipe to a normal pressure within a normal charging time interval and at another time effecting a reduction of fluid pressure therein at a certain rate to initiate a service brake application on the train, apparatus for signalling the integrity of the brake pipe, which apparatus comprises:

(a) fluid pressure responsive valve means operably responsive to an increase in pressure in the brake pipe at said other end of the train above a certain pressure while the integrity of said brake pipe is unimpaired, to effect a venting of the fluid from said brake pipe at a service rate, (b) timing means for preventing said fluid pressure responsive valve means from effecting said venting for a predetermined time interval after said certain pressure is attained in the brake pipe at said other ends of the train; and (c) brake pipe charging flow indicating means remote from said fluid pressure valve means responsive to brake pipe charging flow resulting from venting of the fluid in the brake pipe occasioned by operation of said valve means for indicating the brake pipe integrity condition as a consequence of operation of said fluid pressure responsive valve means.

4. A brake pipe integrity signalling apparatus as claimed in claim 3, further characterized by a second timing means for limiting the duration of the venting of said brake pipe by the fluid pressure resonsive valve means to a length of time predetermined to limit the reduction of fluid pressure in said brake pipe to an amount sufficient to effect a service brake application.

5. For use in a fluid pressure brake system having a brake pipe extending from one end of a train of cars to the other end, means at the said one end of the train for at one time charging said brake pipe to a normal pressure within a normal charging time interval and at another time effecting a reduction of fluid pressure therein at a certain rate to initiate a service brake application on the train, apparatus for signalling the integrity of the brake pipe, which apparatus comprises:

(a) a first valve device operative responsively to fluid under pressure to effect venting of fluid under pressure from the brake pipe, (b) a second valve device operative responsively to fluid at a pressure exceeding a certain pressure to establish a fluid pressure communication for supplying fluid under pressure from the brake pipe to operate said first valve device, (c) a third valve device operative responsively to an increase in fluid pressure in the brake pipe substantially to said normal pressure to establish a fluid pressure communication for supplying fluid from the brake pipe at a pressure exceeding said certain pressure to operate said second valve device, and (d) brake pipe charging flow indicating means remote from said first, second and third valve devices responsive to brake pipe charging flow resulting from venting of the fluid in the brake pipe occasioned by operation of said first valve device.

6. A brake pipe integrity signalling apparatus as claimed in claim 5, further characterized by timing means for causing operation of said first valve device to terminate venting of fluid under pressure from the brake pipe after a certain length of time so as to limit the reduction of fluid pressure from said brake pipe to an amount sufficient to effect a service brake application.

7. A brake pipe integrity signalling apparatus as claimed in claim 6, further characterized by timing means for delaying operation of said third valve device for a predetermined time interval after the elapse of said normal charging time interval of said brake pipe.

8. Vent valve mechanism for venting a pipe charged with fluid under pressure, said vent valve mechanism comprising:

(a) a first valve device operably responsive to fluid under pressure to effect venting of the fluid under pressure from a pipe, (b) a second valve device operably responsive to fluid at a pressure exceeding a first certain pressure to establish a fluid pressure communication via which fluid under pressure is supplied from the pipe to operate said first valve device, and (c) a third valve device operably responsive to a pressure in said pipe above a second certain pressure to establish a communication via which fluid under pressure is supplied from the pipe to operate said second valve device.

9. Vent valve mechanism as claimed in claim 8, further characterized in that said second valve device is operative responsively to supply of fluid at a pressure exceeding said first certain pressure to additionally establish a maintaining communication for supplying fluid thereto at a pressure exceeding said first certain pressure to maintain said second valve device operated independently of the communication established by operation of said third valve device.

10. Vent valve mechanism as claimed in claim 8, further characterized in that said second valve device is operative responsively to supply of fluid at a pressure exceeding said first certain pressure to establish a maintaining communication for supplying fluid thereto at a pressure exceeding said first certain pressure to maintain said second valve device operated independently of the communication established by operation of said third valve device, and choke means in said maintaining communication to restrict the rate of flow of fluid under pressure therethrough to thereby stabilize operation of said second valve device during venting of fluid under pressure from said pipe.

11. A vent valve mechanism for venting a pipe charged with fluid under pressure, said vent valve mechanism comprising:

(a) first valve device having a piston and valve means operated thereby, said piston having fluid pressure chambers on opposite sides thereof and operative when subject opposingly to unbalanced fluid pressures thereon to operate said valve means to effect venting of the pipe and operably responsive to equalization of pressures in said chambers on opposite sides of said piston to operate said valve means to effect termination of venting of the pipe, (b) a second valve device operative responsively to a first certain fluid pressure to establish a fluid pressure communication via which fluid under pressure is supplied from the pipe to the said chambers of said first valve device, (c) timing means interposed in said fluid pressure communication effective during initial supply and build-up of fluid pressure from the pipe to the chambers of said first valve device for restricting the rate of supply of fluid under pressure to one of the said chambers on one side of said piston, and (d) a third valve device operably responsive to an increase in fluid pressure in the pipe above a second certain pressure to establish a fluid pressure communication via which fluid under pressure is supplied from said pipe to operate said second valve device.

References Cited by the Examiner
FOREIGN PATENTS
175,719   6/61   Sweden.

ARTHUR L. LA POINT, *Primary Examiner.*

EUGENE G. BOTZ, *Examiner.*